(12) United States Patent
Sonoda et al.

(10) Patent No.: US 11,579,740 B2
(45) Date of Patent: Feb. 14, 2023

(54) INPUT DEVICE

(71) Applicant: Panasonic Intellectual Property Management Co., Ltd., Osaka (JP)

(72) Inventors: Sho Sonoda, Osaka (JP); Hiroyuki Togawa, Osaka (JP); Noriaki Matsui, Fukui (JP); Naoya Ueda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/551,864

(22) Filed: Dec. 15, 2021

(65) Prior Publication Data

US 2022/0206642 A1 Jun. 30, 2022

(30) Foreign Application Priority Data

Dec. 25, 2020 (JP) .............................. JP2020-216018
Jun. 23, 2021 (JP) .............................. JP2021-104090

(51) Int. Cl.
*G06F 3/044* (2006.01)
*G06F 3/041* (2006.01)

(52) U.S. Cl.
CPC .......... *G06F 3/0447* (2019.05); *G06F 3/0416* (2013.01)

(58) Field of Classification Search
None
See application file for complete search history.

(56) References Cited

U.S. PATENT DOCUMENTS

2011/0141052 A1* 6/2011 Bernstein ................ G06F 3/041
341/5
2016/0125225 A1* 5/2016 Ebihara .................. G06F 3/0446
382/115

FOREIGN PATENT DOCUMENTS

JP 2013-513865 A 4/2013
WO 2011/071837 A2 6/2011

* cited by examiner

*Primary Examiner* — Stephen T. Reed
(74) *Attorney, Agent, or Firm* — Seed IP Law Group LLP

(57) ABSTRACT

An input device includes: an input member that includes a first surface on which an operation is performed by an operation body and a second surface that is a back surface of the first surface; a first electrode that is disposed on the second surface; a second electrode that faces the first electrode and is disposed spaced apart from the first electrode; and a controller that detects a pressing force applied to the input member by an operation performed by the operation body, based on the electrostatic capacitance between the first electrode and the second electrode, and calculates a pressure-sensitivity value that is a value indicating the pressing force detected. Here, the first electrode is electrically connected to the ground.

18 Claims, 10 Drawing Sheets

INPUT DEVICE

CROSS REFERENCE TO RELATED APPLICATIONS

The present application is based on and claims priority of Japanese Patent Application No. 2020-216018 filed on Dec. 25, 2020 and Japanese Patent Application No. 2021-104090 filed on Jun. 23, 2021.

Field

The present disclosure relates to an input device.

Background

Patent Literature (PTL) 1 discloses a touch pad that receives an input from an external object. The touch pad, also referred to as a track pad, includes: a touch pad member including a capacitive touch pad sensor array that determines the location of a touch by an external object; a plurality of force sensors that generate force output signals indicating the amount of downward force applied to the touch pad member by the external object; and storage and processing circuitry that detects a gesture operation of the user.

CITATION LIST

Patent Literature

PTL 1: Japanese Unexamined Patent Application Publication (Translation of PCT Application) No. 2013-513865

SUMMARY

However, the input device according to PTL 1 can be improved upon.

In view of this, the input device according to the present disclosure is capable of improving upon the above related art.

The input device according to an aspect of the present disclosure includes: an input member that includes a first surface on which an operation is performed by an operation body and a second surface that is a back surface of the first surface; a first electrode that is disposed on the second surface; a second electrode that faces the first electrode and is disposed spaced apart from the first electrode; and a controller that detects a pressing force applied to the input member by an operation performed by the operation body, based on an electrostatic capacitance between the first electrode and the second electrode, and calculates a pressure-sensitivity value that is a value indicating the pressing force detected. Here, the first electrode is electrically connected to a ground.

Note that this comprehensive or specific aspect may be implemented using any combination of systems, methods, integrated circuits, etc.

The input device according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Figure 1:
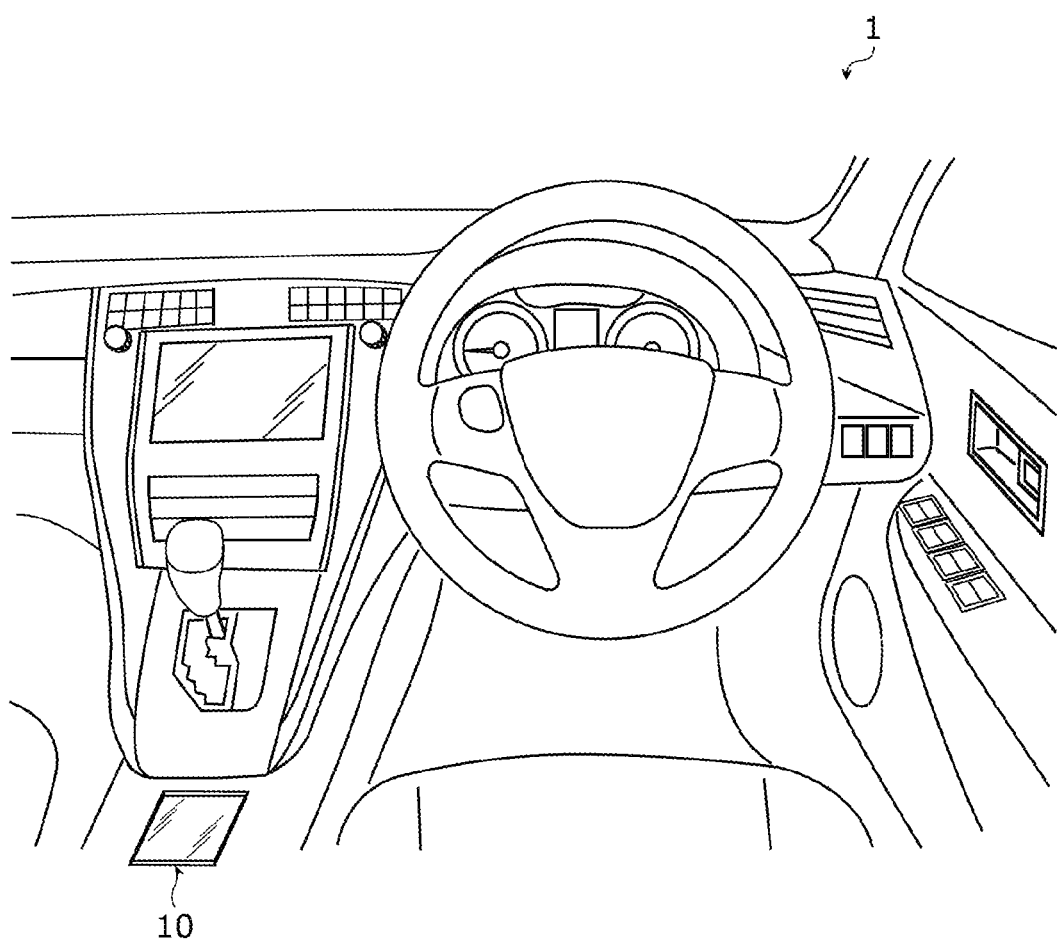
FIG. 1 is a schematic diagram showing an exemplary vehicle interior of a vehicle in which an input device according to Embodiment 1 is disposed.

The input device such as the touch pad disclosed in PTL 1 is desired to be capable of accurately detecting a downward force applied to the touch pad member.

In view of this, the input device according to an aspect of the present disclosure includes: an input member that includes a first surface on which an operation is performed by an operation body and a second surface that is a back surface of the first surface; a first electrode that is disposed on the second surface; a second electrode that faces the first electrode and is disposed spaced apart from the first electrode; and a controller that detects a pressing force applied to the input member by an operation performed by the operation body, based on an electrostatic capacitance between the first electrode and the second electrode, and calculates a pressure-sensitivity value that is a value indicating the pressing force detected. Here, the first electrode is electrically connected to a ground.

With this, when the first surface is pressed downward by the operation body, the first electrode on the second surface approaches the second electrode. This arises a change in the electrostatic capacitance between the first electrode and the second electrode, thus enabling the controller to accurately detect the pressing force applied to the input member by an operation performed by the operation body. Stated differently, such input device is capable of accurately calculating a pressure-sensitivity value, which is a value indicating the pressing force applied by an operation performed by the operation body.

Even when the input member comprises an easy-to-bend member, for example, the first electrode on the second surface approaches the second electrode due to the bending of the input member. This enables the detection of the pressing force applied to the input member.

Further, since the first electrode on the second surface is connected to the ground, no change occurs in the electrostatic capacitance between the first electrode and the second electrode even when the operation body approaches the first electrode. For this reason, even when the user inadvertently brings the operation body close to the first electrode without intending to apply a pressing force, it is possible to prevent such action from being detected as a pressing operation on the input member.

The input device with this configuration is thus capable of accurately detecting a pressing operation performed by the operation body.

The input device according to an aspect of the present disclosure also includes: a ground electrode that is electrically connected to the ground and disposed in a position that corresponds to a position of the first electrode; and a conductive member that is sandwiched between the first electrode and the ground electrode.

In this configuration, the first electrode is connected to the ground via the conductive member, etc. As such, even when the operation body inadvertently touches the first surface without intending to apply a pressing force, no change occurs in the electrostatic capacitance between the first electrode and the second electrode. This thus further prevents an inadvertent touch by the operation body from being detected as a pressing operation.

The input device according to an aspect of the present disclosure also includes: a first substrate on which the second electrode and the ground electrode are provided.

This configuration enables the second electrode and the ground electrode to be disposed on a single substrate, thus eliminating the necessity to provide a different substrate for the second electrode or the ground electrode. This configuration prevents an increase in the number of assembly steps required for the input device, thus preventing a rise in the product cost of the input device.

The input device according to an aspect of the present disclosure also includes: a first substrate on which the second electrode is provided; and a second substrate on which the ground electrode is provided. Here, wherein the first substrate is disposed between the second substrate and the input member.

With this configuration, a space provided between the first substrate and the second substrate can be used, for example, to dispose a vibration actuator for force feedback and a structure such as the controller. This configuration provides an increased flexibility in the dispositions of the second electrode and the ground electrode, thus improving the flexibility in the design of the input device.

Also, in the input device according to an aspect of the present disclosure, the conductive member is disposed in each of four corners of the input member.

With this configuration, the conductive member supports each of the four corners of the input member. As such, a portion of the input member other than the four corners is easy to bend when being pressed downward. Stated differently, it is possible to ensure a sufficient amount of bending of the input member. The bending of the input member causes the first electrode on the second surface to approach the second electrode, thus enabling the detection of the pressing force applied to the input member.

Also, in the input device according to an aspect of the present disclosure, the first electrode is disposed along a side edge of the second surface.

This configuration provides a region, in the central portion on the second surface, for example, where another electrode such as the third electrode is to be disposed.

The input device according to an aspect of the present disclosure also includes: a third electrode that is disposed to face the second surface of the input member. Here, the third electrode is disposed in a position closer to a central portion of the input member than a position of the first electrode is, when viewed in a direction in which the third electrode faces the second surface of the input member.

This configuration enables the third electrode for detecting a user operation to be disposed at the side of the central portion of the input member in a manner that the third electrode and the first electrode do not interfere with each other.

Also, in the input device according to an aspect of the present disclosure, the third electrode is a touch electrode for detecting a location in the input member touched by the operation body.

This configuration enables the touch electrode to be disposed at the side of the central portion of the input member, thus facilitating a user operation performed on the input device.

Also, in the input device according to an aspect of the present disclosure, the width of the second electrode is less than the width of the first electrode.

When the width of the second electrode is greater than the width of the first electrode, for example, the first electrode can fail to flow a sufficient amount of charge generated in the second electrode to the ground electrode. The first electrode according to the present disclosure, however, is capable of flowing charge generated in the second electrode to the ground electrode. The configuration thus enables a more accurate detection of the pressing force applied to the input member.

Also, in the input device according to an aspect of the present disclosure, the first electrode does not overlap the third electrode, when viewed in the direction in which the third electrode faces the second surface of the input member.

This configuration ensures both the detection accuracy of the first electrode and the detection accuracy of the third electrode.

Also, in the input device according to an aspect of the present disclosure, a plurality of first electrodes are serially connected along side edges of the second surface, the plurality of first electrodes each being the first electrode, and at least one conductive member is provided between the plurality of first electrodes and the ground electrode, the at least one conductive member each being the conductive member.

This configuration requires only a single first electrode to be disposed on the second surface to establish an electrical connection to the ground electrode via a single conductive member. This configuration requires only at least one conductive member, thus providing a wider selection of members to be disposed on the second surface.

Also, in the input device according to an aspect of the present disclosure, the input member is bendable by the pressing force applied to the input member by the operation performed by the operation body, and the second electrode is disposed more spaced apart from the conductive member than the ground electrode is spaced apart from the conductive member.

In this configuration, the second electrode is disposed spaced apart from the position where the conductive member is sandwiched between the first electrode and the ground electrode. It is thus possible to dispose the second electrode in a position in the input member which is easy to bend. This enables the controller to more accurately detect the pressing force applied to the input member by an operation performed by the operation body.

Also, the second electrode is disposed spaced apart from the conductive member more than the ground electrode is spaced apart from the conductive member. Stated differently, the ground electrode is disposed in the vicinity of the conductive member where the input member is hard to bend, whereas the second electrode is disposed in a position where the input member is easy to bend. This enables the controller to more accurately detect the pressing force applied to the input member by an operation performed by the operation body.

Also, in the input device according to an aspect of the present disclosure, the first surface is partitioned to include a plurality of detection regions to detect a location where the pressing force is applied to the input member by the operation performed by the operation body, a plurality of second electrodes are disposed on the first substrate in one-to-one correspondence with the plurality of detection regions, the plurality of second electrodes each being the second electrode, and the controller detects the location where the operation is performed by the operation body, based on the electrostatic capacitance between the first electrode and each of the plurality of second electrodes.

With this, it is possible to detect the location in the input member to which the pressing force is applied by an operation performed by the operation body, without a touch sensor for detecting the location of such pressing operation. This thus prevents a rise in the product cost of the input device.

Also, in the input device according to an aspect of the present disclosure, the plurality of second electrodes are grouped into a plurality of groups each including at least two of the plurality of second electrodes, and the controller calculates, for each of the plurality of groups, a total value by adding up values of the electrostatic capacitance between the plurality of second electrodes and the first electrode, and calculates a barycenter based on the total value to detect the location where the operation is performed by the operation body.

With this, it is possible to detect the location where the operation is performed. The input device having a simple configuration achieves the detection of a location in the central portion which is pressed downward, thus eliminating the necessity of using, for example, a touch pad, etc. This configuration thus prevents the configuration of the input device from becoming complicated.

Also, in the input device according to an aspect of the present disclosure, when an X-axis direction and a Y-axis direction that is perpendicular to the X-axis direction are defined on a surface of the first substrate, ones of the plurality of second electrodes are disposed in a plurality of lines which run along the X-axis direction and between which a central portion of the surface of the first substrate is located and remaining ones of the plurality of second electrodes are disposed in a plurality of lines which run along the Y-axis direction and between which the central portion of the surface of the first substrate is located, the plurality of second electrodes are grouped into the plurality of groups each including at least two of the plurality of second electrodes that face each other across the central portion, and the controller calculates, for each of the plurality of groups, the total value by adding up the values of the electrostatic capacitance between the plurality of second electrodes and the first electrode, and calculates the barycenter based on the total value to detect the location where the operation is performed by the operation body.

With this, it is possible to more accurately detect the location where the operation is performed.

The input device according to an aspect of the present disclosure also includes: a storage that stores a plurality of correction values assigned to a plurality of regions into which the first surface is preliminarily partitioned according to settings. Here, the controller: detects, from the plurality of regions, a region that corresponds to a location where the pressing force is detected, the pressing force being applied to the input member by the operation performed by the operation body; obtains a corresponding one of the correction values that is assigned to the region detected; and corrects the pressure-sensitivity value that is the value indicating the pressing force detected, based on the corresponding one of the correction values obtained, the pressing force being applied to the input member.

With this, it is possible to correct the pressure-sensitivity value on the basis of the amount of bending that depends on a location in the input member, regardless of the location to which the pressing force is applied to the input member by an operation performed by the operation body. This configuration thus enables an accurate detection of the pressing force applied to the input member.

Also, in the input device according to an aspect of the present disclosure, each of the correction values is a value that is calculated based on an amount of bending of the input member when the first surface is pressed downward by the operation body with a constant load With this, it is possible to calculate a correction value in consideration of the properties of the input member, a member relating to an orientation of the input member, etc. This configuration thus enables a more accurate detection of the pressing force applied to the input member.

Note that the following embodiments show a comprehensive or specific illustration of the present disclosure. The numerical values, shapes, materials, structural components, the arrangement and connection of the structural components, steps, the processing order of the steps, etc. shown in the following embodiments, etc. are mere examples, and thus are not intended to limit the present disclosure. Of the structural components described in the following embodiments, those not recited in any one of the independent claims that indicate the broadest concepts of the present disclosure will be described as optional structural components.

Note that the drawings are schematic diagrams, and thus are not necessarily precise illustrations. Also, the same structural components are assigned the same reference marks throughout the drawings. The following embodiments use expressions "substantially parallel", "rectangular shape" and so forth. The expression "substantially parallel" or "rectangular shape", for example, not only means being "completely parallel" or "completely rectangular" but also being "virtually parallel" or "virtually rectangular". Stated differently, the meanings of these expressions include some errors on the order, for example, of a few percent. Also, the expression "substantially parallel" or "rectangular shape" means being parallel or rectangular within a range in which the effects of the present disclosure are achievable. This is also applicable to other expressions using "substantially" and "shape".

In the following description, the direction at the side of the input member with respect to the first substrate is referred to as the positive direction of the Z-axis. The direction that is perpendicular to the positive direction of the Z-axis is referred to as the positive direction of the X-axis. The direction that is perpendicular to the positive direction of the X-axis and the positive direction of the Z-axis is referred to as the positive direction of the Y-axis.

Hereinafter, certain exemplary embodiments are described in greater detail with reference to the accompanying Drawings.

Embodiment 1

Configuration: Input Device 10

FIG. 1 is a schematic diagram showing an exemplary vehicle interior of vehicle 1 in which input device 10 according to Embodiment 1 is disposed.

As shown in FIG. 1, the vehicle interior of vehicle 1 is equipped with on-board devices (not illustrated) and input device 10. In the vehicle interior of vehicle 1, input device 10 is provided within the reach of a user who is onboard in a seat of vehicle 1. Input device 10 is disposed, for example, at or in the vicinity of the center console, etc. in the vehicle interior of vehicle 1. Input device 10 is disposed, for example, at the rear side of the shift lever of vehicle 1. Input device 10 is not limited to being disposed in the position described in the present embodiment and thus may be disposed in another position in the vehicle interior.

The user performs an operation (more specifically, pressing operation) onto input device 10, thereby being able to operate an on-board device mounted in vehicle 1. To control on-board devices, input device 10 outputs, to each on-board device, an instruction corresponding to a user operation upon receiving such operation. This causes each on-board device to operate in accordance with the operation. Here, the pressing operation is an operation, intentionally performed by the user with an operation body of the user, of pressing downward on input member 20 to be described later.

Examples of the on-board devices include: a car navigation system with a display device, etc.; an audio device for reproducing an optical disc; a vehicle air-conditioner; an on-board lighting device; and a video reproduction device.

In this case, input device 10 is capable of operating a user interface (UI) displayed on the display device of each on-board device. Input device 10 may also operate the UI to operate, thereby being able to operate the audio device, the vehicle air-conditioner, the on-board lighting device, the video reproduction device, etc.

Figure 2:
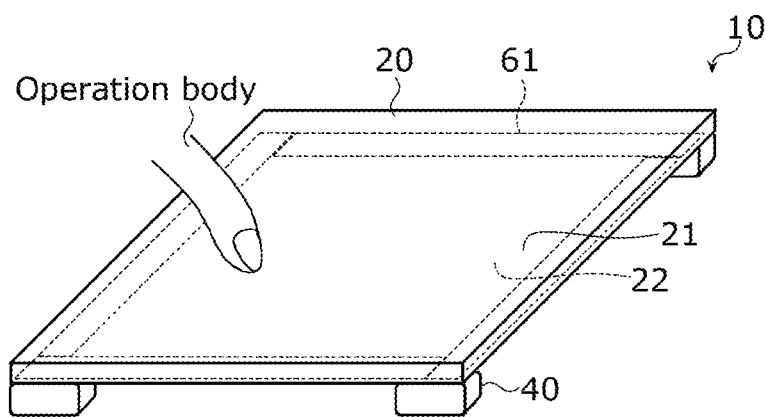
FIG. 2 is an exploded perspective view showing an example of the input device according to Embodiment 1.
Figure 2:
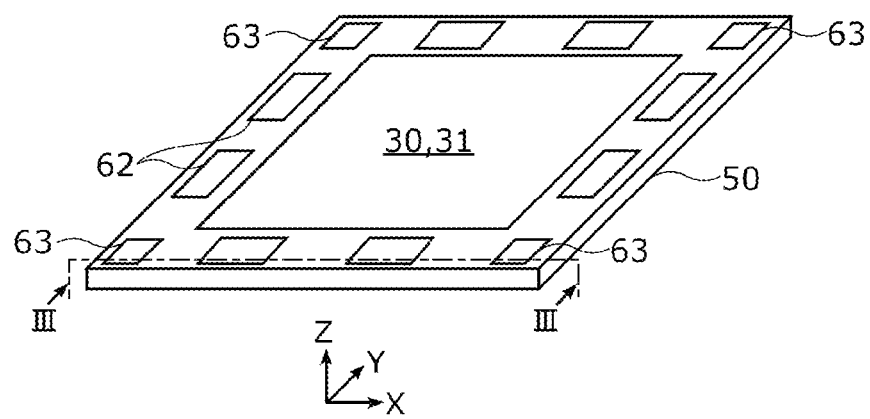
Figure 3:
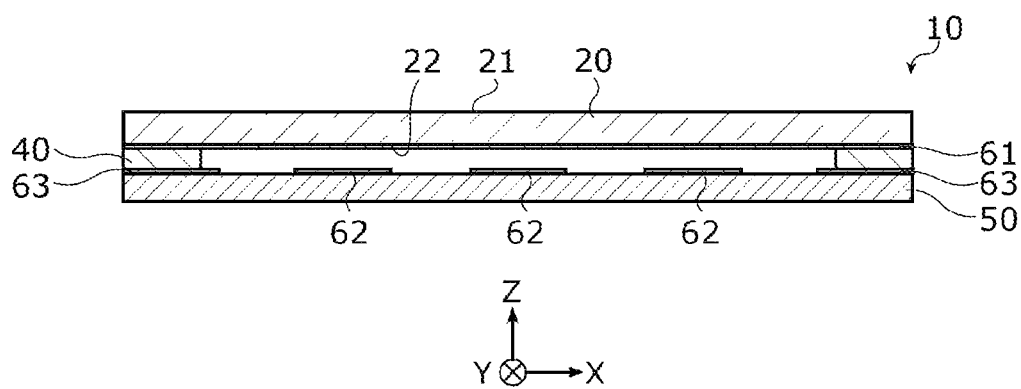
FIG. 3 is a cross-sectional view showing an example of the input device cut along III-III line shown in FIG. 2.
Figure 4:
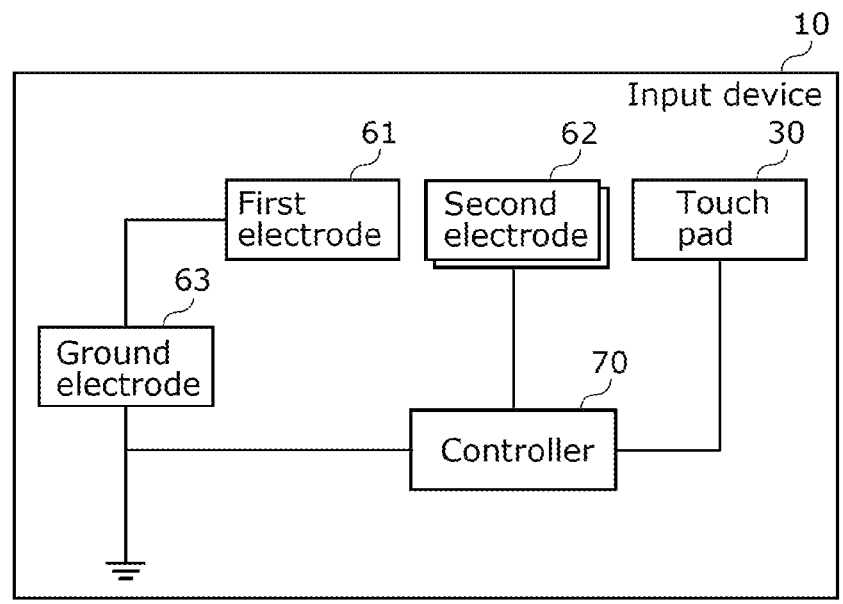
FIG. 4 is a block diagram showing an example of the input device according to Embodiment 1.

FIG. 2 is an exploded perspective view showing an example of input device 10 according to Embodiment 1. FIG. 3 is a cross-sectional view showing an example of input device 10 cut along III-III line shown in FIG. 2. FIG. 4 is a block diagram showing an example of input device 10 according to Embodiment 1.

As shown in FIG. 2 through FIG. 4, input device 10 includes input member 20, touch pad 30, first electrodes 61, conductive members 40, first substrate 50, ground electrodes 63, second electrodes 62, and controller 70.

Input Member 20

Input member 20 is disposed in a manner that allows the user to directly operate input member 20 by touching input member 20 with an operation body of the user. Input member 20 is exposed to outside from input device 10. Input member 20 is a substantially parallel flat sheet or plate disposed in an orientation that is substantially parallel to the X-Y plane. In the present embodiment, input member 20 has a rectangular shape in a plan view. Note that the shape of input member 20 in a plan view is not limited to a rectangular shape, and thus may be a circular shape, a multangular shape, or a combination of these shapes. Input member 20 comprises, for example, glass, an acrylic sheet or plate, etc. Input member 20 may also comprise a member having a small thickness. Here, the operation body is, for example, a user's finger with which the user performs an operation, a pen-shaped operation stylus, etc.

Input member 20 includes first surface 21 and second surface 22.

First surface 21 is a surface on which an operation is performed by the operation body. First surface 21 is a surface of input member 20 externally exposed from input device 10. First surface 21 is also a surface that is substantially parallel to the X-Y plane, located at the side of the positive direction of the Z-axis. In the present embodiment, first surface 21 has a rectangular shape in a plan view in accordance with the shape of input member 20.

Second surface 22 is the back surface of input member 20 opposing first surface 21. Second surface 22 is also a surface that is substantially parallel to the X-Y plane, located at the side of the negative direction of the Z-axis. In the present embodiment, second surface 22 also has a rectangular shape in a plan view in accordance with the shape of input member 20.

Touch Pad 30

Touch pad 30 is an operation location detection sensor for detecting the location of a user operation. Upon an input of a user operation to input member 20, touch pad 30 detects the location of such operation to control an on-board device. Touch pad 30 includes, for example, capacitive touch electrode 31, an electrostatic integrated circuit (IC) electrically connected to touch electrode 31, and so forth. Touch electrode 31 is disposed on a surface of first substrate 50 (the surface at the side of the positive direction of the Z-axis) to face second surface 22 of input member 20. More specifically, touch electrode 31 is disposed in a position that corresponds to the central portion of first surface 21 and is covered with input member 20 when viewed in the Z-axis direction. The electrostatic IC detects the location within a region detectable by touch electrode 31 that is touched by the user with the operation body.

Note that touch pad 30 may also be a sensor that receives a plurality of touches by the user, i.e., a multitouch. For example, in addition to detecting the location of a touch with a single finger, touch pad 30 may be configured to receive, at the same timing, locations of two touches with two fingers and locations of thee touches with three fingers.

First Electrode 61

First electrodes 61 are disposed on second surface 22. More specifically, in a state of being attached to second surface 22, first electrodes 61 are fixed to input member 20. First electrodes 61 may comprise a metal thin film, etc. formed by vapor deposition, etc. In the present embodiment, each first electrode 61 has a belt-like shape disposed along a side edge of second surface 22 having a rectangular shape. First electrodes 61 are disposed at the respective four side edges of second surface 22 to surround the central portion of second surface 22 when viewed in the Z-axis direction.

Stated differently, first electrodes 61 are disposed on second surface 22 to surround touch electrode 31, when viewed in the Z-axis direction, without overlapping touch electrode 31.

Note that first electrodes 61 may be electrically connected with each other or electrically independent with each other.

Note that the foregoing disposition of first electrodes 61 is merely an example. First electrode(s) 61 thus may be disposed, for example, only in one or more of the four sides of second surface 22, or may be disposed at the central portion of second surface 22. Also note that first electrodes 61 can be differently disposed, where necessary, depending on the disposition of touch electrode 31.

First electrodes 61 are electrically connected to the ground. More specifically, first electrodes 61 are electrically connected to ground electrodes 63 via conductive members 40.

Conductive Member 40

Conductive members 40 are disposed between input member 20 and first substrate 50, and interposed between first electrodes 61 and ground electrodes 63. Stated differently, conductive members 40 also serve as a spacer that provides a gap between input member 20 and first substrate 50. Conductive members 40 hold input member 20 against first substrate 50 such that input member 20 and first substrate 50 are in an orientation that is parallel to each other.

Conductive members 40 are in intimate contact with first electrodes 61, thereby being electrically connected to first electrodes 61. Conductive members 40 are also in intimate contact with ground electrodes 63, thereby being electrically connected to ground electrodes 63. With this, conductive members 40 are grounded (electrically connected to the ground) together with first electrodes 61, thus being able to flow charge to ground electrodes 63 in the event of charge transfer around first electrodes 61. Such conductive members 40 comprise, for example, conductive silicon, conductive rubber, etc.

In the present embodiment, conductive members 40 are disposed at the respective four corners (corner portions) of second surface 22. Although being disposed at the four corners, conductive members 40 may be differently disposed or may have a different shape, where necessary, depending on the shape of input member 20 and the disposition of first electrodes 61.

First Substrate 50

First substrate 50 is a substantially parallel flat sheet or plate disposed in an orientation that is substantially parallel to the X-Y plane. First substrate 50 is supported in an orientation that is substantially parallel to input member 20 via conductive members 40.

In the present embodiment, first substrate 50 has a rectangular shape in a plan view. Note that the shape of first substrate 50 in a plan view is not limited to a rectangular shape, and thus may be a circular shape, a multangular shape, or a combination of these shapes.

Examples of first substrate 50 to be used include a printed wiring substrate, a rigid substrate, a flexible substrate, a metal-based substrate, a ceramics substrate, a resin substrate mainly comprising a resin material, etc.

In the present embodiment, a plurality of second electrodes 62, a plurality of ground electrodes 63, and touch electrode 31 are disposed on a surface of first substrate 50. Touch electrode 31 is disposed at the central portion on the surface of first substrate 50, and a plurality of second electrodes 62 and a plurality of ground electrodes 63 are disposed to surround touch electrode 31.

Ground Electrode 63

Ground electrodes 63 are electrically connected to the ground. When charge transfer occurs around first electrodes 61, such charge flows via conductive members 40. Ground electrodes 63 are disposed in positions that correspond to first electrodes 61. Stated differently, ground electrode 63 is disposed at each of the four corners (corner portions) of first substrate 50 (stated differently, at the four corners of second surface 22). Although being disposed at the four corners of first substrate 50, ground electrodes 63 may be differently disposed or may have a different shape, where necessary, depending on the shape of first substrate 50 and the disposition of conductive members 40.

Second Electrode 62

Second electrodes 62 are sensor electrodes that are disposed to face first electrodes 61 and are spaced apart from first electrodes 61. Stated differently, second electrodes 62 overlap first electrodes 61 when viewed in the Z-axis direction. Second electrodes 62 are spaced apart from first electrodes 61 by a gap formed by conductive members 40 between input member 20 and first substrate 50.

Second electrodes 62 are disposed on the same plane as the plane on which ground electrodes 63 are disposed. Second electrodes 62 are disposed on a surface of first substrate 50, electrically independent from ground electrodes 63. Also, second electrodes 62 are disposed between ground electrodes 63 that are disposed at the four corners of first substrate 50. In the present embodiment, a plurality of second electrodes 62 are disposed along the four side edges of a surface of first substrate 50. Although being disposed along the four sides of the surface of first substrate 50, a plurality of second electrodes 62 may be differently disposed or may have a different shape, where necessary, depending on the shape of first substrate 50 and the disposition of first electrodes 61.

Controller 70

Controller 70 detects a pressing force applied to input member 20 by an operation performed by the operation body, on the basis of the electrostatic capacitance between first electrode 61 and second electrode 62. More specifically, electrically connected to ground electrodes 63 and second electrodes 62, controller 70 obtains a signal indicating the electrostatic capacitance that depends on the distance between first electrode 61 and second electrode 62 which has changed by the pressing force applied to input member 20 by the operation body. On the basis of the obtained signal, controller 70 detects the pressing force applied to input member 20 by an operation performed by the operation body, and calculates, from the detected value, a pressure-sensitivity value indicating the amount of the pressing force.

Various methods are available for the calculation of a pressure-sensitivity value. For example, as a pressure-sensitivity value, controller 70 may use: the maximum electrostatic capacitance value among the electrostatic capacitance values detected by all second electrodes 62; the value obtained by adding up the electrostatic capacitance values detected by the respective second electrodes 62; and the mean value of the electrostatic capacitance values detected by all second electrodes 62.

When the operation body merely touches first surface 21 of input member 20, as a result of which no change occurs in the distance between first electrode 61 and second electrode 62 and thus no substantial change occurs in the electrostatic capacitance between first electrode 61 and second electrode 62, controller 70 does not detect such pressing force applied to input member 20 by an operation performed by the operation body.

Also, controller 70 is electrically connected to touch pad 30. Controller 70 obtains a signal indicating the location detected by the electrostatic IC of touch pad 30. Subsequently, controller 70 transmits to an on-board device an instruction corresponding to the signal indicating the location. Such control by controller 70 is implemented using a microcomputer, etc.

Controller 70 operates on electric power supplied from a power source not illustrated. The power source is, for example, a non-illustrated battery, etc. mounted on the vehicle.

Operation

Figure 5:
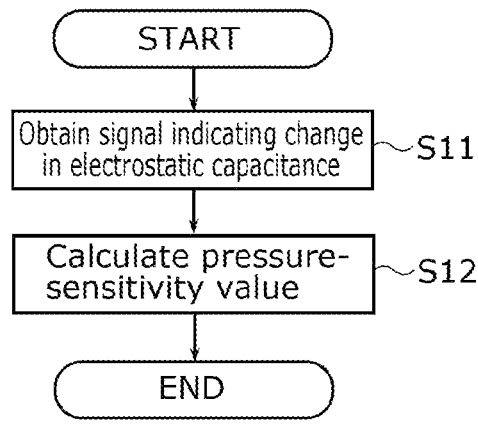
FIG. 5 is a flowchart of an operation performed by the input device according to Embodiment 1.

With reference to FIG. 5, an operation performed by input device 10 will be described.

FIG. 5 is a flowchart of an operation performed by input device 10 according to Embodiment 1.

As shown in FIG. 5, input member 20 bends when the user presses downward on first surface 21 of input member 20 with the operation body. This brings first electrode 61 close to second electrode 62, as a result of which the distance between first electrode 61 and second electrode 62 becomes shorter. This arises a change in the electrostatic capacitance between first electrode 61 and second electrode 62. Controller 70 detects such change in the electrostatic capacitance, and obtains the change as a signal indicating the electrostatic capacitance (S11).

Controller 70 detects the pressing force applied to input member 20 on the basis of the electrostatic capacitance indicated by the obtained signal, i.e., the electrostatic capacitance value, and calculates a pressure-sensitivity value indicating the amount of the pressing force detected (S12).

Then, controller 70 ends the processing.

Here, first electrodes 61 are electrically connected to the ground. As such, even when the operation body approaches the back surface (first surface 21) of the surface on which first electrodes 61 are disposed, no change occurs in the electrostatic capacitance between first electrodes 61 and second electrodes 62 and such approach is not detected as a pressing operation.

Stated differently, even when the user inadvertently brings the operation body close to the first electrode without intending to apply a pressing force, it is possible to prevent such action from being detected as a pressing operation on the input member.

Operational Advantages

The following describes the operational advantages achieved by input device 10 according to the present embodiment.

As described above, input device 10 according to the present embodiment includes: input member 20 that includes first surface 21 on which an operation is performed by an operation body and second surface 22 that is the back surface of first surface 21; first electrode 61 that is disposed on second surface 22; second electrode 62 that faces first electrode 61 and is disposed spaced apart from first electrode 61; and controller 70 that detects a pressing force applied to input member 20 by an operation performed by the operation body, based on the electrostatic capacitance between first electrode 61 and second electrode 62, and calculates a pressure-sensitivity value that is a value indicating the pressing force detected. Here, first electrode 61 is electrically connected to the ground.

With this, when first surface 21 is pressed downward by the operation body, first electrode 61 on second surface 22 approaches second electrode 62. This arises a change in the electrostatic capacitance between first electrode 61 and second electrode 62, thus enabling controller 70 to accurately detect the pressing force applied to input member 20 by an operation performed by the operation body. Stated differently, input device 10 is capable of accurately calculating a pressure-sensitivity value, which is a value indicating the pressing force applied by an operation performed by the operation body.

Even when input member 20 is configured to be easy to bend at a portion that is pressed downward before the entirety of input member 20 is depressed, in response to the pressing force applied to first surface 21 by the operation body, first electrode 61 on second surface 22 approaches second electrode 62 due to such bending. This thus enables the detection of the pressing force applied to input member 20.

Also, first electrode 61 on second surface 22 is connected to the ground. As such, even when the operation body approaches first electrode 61, no change thus occurs in the electrostatic capacitance between first electrode 61 and second electrode 62. For this reason, even when the user inadvertently approaches the operation body to first electrode 61 without intending to apply a pressing force, such action is prevented from being detected as a pressing operation.

Input device 10 is thus capable of accurately detecting a pressing operation performed by the operation body.

Also, input device 10 according to the present embodiment includes: ground electrode 63 that is electrically connected to the ground and disposed in a position that corresponds to a position of first electrode 61; and conductive member 40 that is sandwiched between first electrode 61 and ground electrode 63.

In this configuration, first electrode 61 is connected to the ground via conductive member 40, etc. As such, even when the operation body inadvertently touches first surface 21 without intending to apply a pressing force, no change occurs in the electrostatic capacitance between first electrode 61 and second electrode 62. This thus further prevents an inadvertent touch by the operation body from being detected as a pressing operation.

Also, input device 10 according to the present embodiment includes first substrate 50 on which second electrode 62 and ground electrode 63 are provided.

This configuration enables second electrode 62 and ground electrode 63 to be disposed on a single substrate, thus eliminating the necessity to provide a different substrate for second electrode 62 or ground electrode 63. This configuration prevents an increase in the number of mounting steps required for input device 10, thus preventing a rise in the product cost of input device 10.

Variation of Embodiment 1

The present variation is different from Embodiment 1 in the point, for example, that input device 10a according to the present variation includes a second substrate. The other configuration of the present variation is the same as that of Embodiment 1 unless otherwise specified, and thus the same elements as those of Embodiment 1 are assigned the same reference marks and will not be described in detail.

Figure 6:
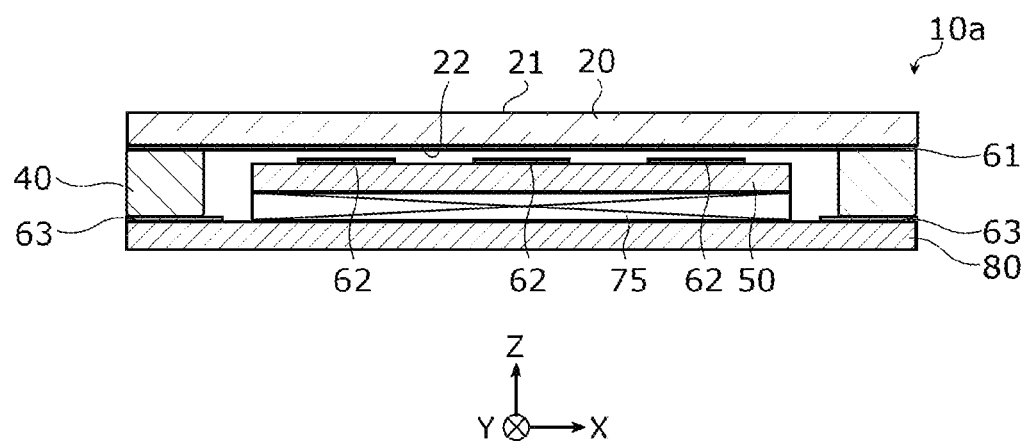
FIG. 6 is a cross-sectional view showing an exemplary input device according to a variation of Embodiment 1.

FIG. 6 is a cross-sectional view showing an example of input device 10a according to a variation of Embodiment 1.

As shown in FIG. 6, second electrodes 62 and the touch electrode are disposed on a surface of first substrate 50. Ground electrodes 63 are disposed on a surface of second substrate 80, which is different from first substrate 50. Stated differently, second electrodes 62 and ground electrodes 63 are disposed on different substrates.

In the present variation, a plurality of second electrodes 62 are disposed on a surface of first substrate 50. Also in the present variation, a plurality of ground electrodes 63 are disposed on a surface of second substrate 80. First substrate 50 and second substrate 80 are grounded to the same ground.

In the present variation, no conductive member 40 is disposed between first substrate 50 and input member 20, meaning that first substrate 50 is not supported by input member 20 via conducive members 40. First substrate 50 is fixed to structure 75 or second substrate 80.

First substrate 50 is disposed between second substrate 80 and input member 20. Structure 75 is also disposed between first substrate 50 and second substrate 80. Structure 75 includes, for example, controller 70, an actuator, a switch element, etc. Structure 75 may be mounted on second substrate 80. Fixed to structure 75 or second substrate 80, first substrate 50 is in an orientation that is substantially parallel to input member 20.

Second substrate 80 is a substantially parallel flat sheet or plate disposed in an orientation that is substantially parallel to the X-Y plane. Second substrate 80 is supported in an orientation that is substantially parallel to input member 20 via conductive members 40.

In the present variation, second substrate 80 has a rectangular shape in a plan view. Note that the shape of second substrate 80 in a plan view is not limited to a rectangular shape, and thus may be a circular shape, a multangular shape, or a combination of these shapes. Examples of second substrate 80 to be used include a printed wiring substrate, a rigid substrate, a flexible substrate, a metal-based substrate, a ceramics substrate, a resin substrate mainly comprising a resin material, etc.

As described above, input device 10a according to the present variation includes first substrate 50 on which second electrodes 62 are disposed and second substrate 80 on which ground electrodes 63 are disposed. Also, first substrate 50 is disposed between second substrate 80 and input member 20.

With the foregoing configuration, a space provided between first substrate 50 and second substrate 80 can be used, for example, to dispose a vibration actuator for force feedback and structure 75 such as controller 70. As described above, the present variation provides an increased flexibility in the dispositions of second electrodes 62 and ground electrodes 63, thus improving the flexibility in the design of input device 10a.

The present variation thus provides the same operational advantages as those provided by Embodiment 1 described above.

Embodiment 2

The present embodiment is different from Embodiment 1 in the point, for example, that input device 10b according to the present embodiment includes holding member 90. The other configuration of the present embodiment is the same as that of Embodiment 1 unless otherwise specified, and thus the same elements as those of Embodiment 1 are assigned the same reference marks and will not be described in detail.

Configuration

Figure 7:
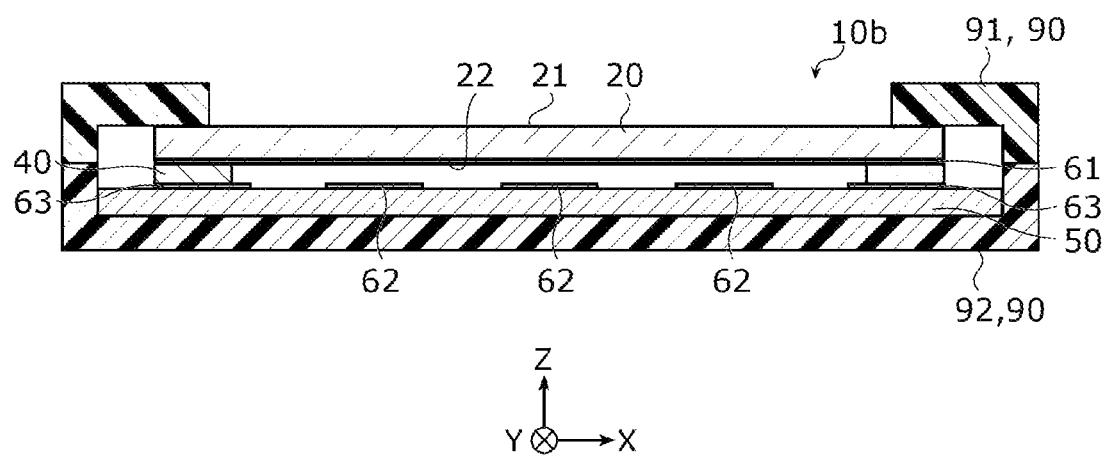
FIG. 7 is a cross-sectional view showing an exemplary input device according to Embodiment 2.

FIG. 7 is a cross-sectional view showing an example of input device 10b according to Embodiment 2.

As shown in FIG. 7, input device 10b further includes holding member 90, in addition to input member 20, the touch pad, first electrodes 61, conductive members 40, first substrate 50, ground electrodes 63, second electrodes 62, and the controller.

Holding member 90 holds at least input member 20. In the present embodiment, holding member 90 integrally holds a laminated body that includes input member 20, conductive members 40, and first substrate 50 in a manner that the laminated body is sandwiched from both the positive direction of the Z-axis and the negative direction of the Z-axis. Holding member 90 also serves as a housing that houses the laminated body.

Holding member 90 includes frame body 91 and case 92.

Frame body 91 supports input member 20 at the side edges of input member 20 in a manner that first surface 21 of input member 20 is partially exposed. Frame body 91 is, for example, a supporting member having a long belt-like shape. Note that frame body 91 may be configured in accordance with the shape of input member 20, and thus may have a substantially rectangular ring shape. Note that the shape of frame body 91 is not limited to a substantially rectangular shape, and thus may be a circular shape, a multangular shape, or a combination of these shapes.

Frame body 91 holds the side edges of input member 20. More specifically, frame body 91 is in direct contact with the side edges of first surface 21 of input member 20, thereby pressing input member 20 toward first substrate 50 (in the negative direction of the Z-axis).

Case 92 is a box having the bottom that is flat in the Z-axis direction and extends in the X-Y axis directions. Case 92 has an opening at the side of frame body 91 (the positive direction of the Z-axis). Frame body 91 is attached to such opening of case 92. First substrate 50 included in the laminated body is disposed in the bottom portion of case 92. The bottom portion of case 92 presses first substrate 50 toward input member 20 (in the positive direction of the Z-axis).

As described above, sandwiched between frame body 91 and case 92 from both sides, the laminated body is integrally fixed by frame body 91 and case 92. As such, in a plan view of input member 20 and second electrodes 62 from the direction in which input member 20 and second electrodes 62 are arranged (in the Z-axis direction), holding member 90 holds input member 20 in a manner that first electrodes 61 and second electrodes 62 overlap, with a gap formed by conductive members 40 between first electrodes 61 and second electrodes 62.

Note that when holding member 90 holds only input member 20, input member 20 may be simply attached to holding member 90 with an adhesive member, etc.

Input member 20 is bendable by the pressing force applied to input member 20 by an operation performed by the operating body. Stated differently, a portion of input member 20 pressed downward by the operation body bends, thereby readily reducing the distance between first electrode 61 and second electrode 62. This arises a change in the electrostatic capacitance between first electrode 61 and second electrode 62.

Second electrodes 62 are disposed spaced apart from conductive members 40 more than ground electrodes 63 are spaced apart from conductive members 40. Second electrodes 62 are also disposed spaced apart from ground electrodes 63 and from the positions where input member 20 is held by holding member 90.

More specifically, since the side edges of input member 20 are sandwiched between frame body 91 and case 92, those areas in the vicinity of the side edges of first surface 21 of input member 20 which contact frame body 91 are hard to bend even when being pressed downward by an operation performed by the operation body. For this reason, second electrodes 62 are disposed spaced apart as much as possible from frame body 91 that is disposed at side edges of first surface 21. As shown in FIG. 7, a plurality of second electrodes 62 are disposed between two adjacent ground electrodes 63, thereby being spaced apart from frame body 91.

This configuration enables an easy detection of the bending of input member 20 that is caused by an operation performed by the operation body.

A portion of input member 20 in which a gap is provided between input member 20 and first substrate 50 is easier to bend than portions of input member 20 in which conductive members 40 are disposed between input member 20 and first substrate 50 (in an example of FIG. 2, at four corners of input member 20).

For this reason, second electrodes 62 are disposed spaced apart from conductive members 40 more than ground electrodes 63 are spaced apart from conductive members 40. More specifically, in an example shown in FIG. 2, conductive members 40 are disposed at the respective four corners of second surface 22, and ground electrodes 63 are disposed at the respective four corners of first substrate 50. Also, a plurality of second electrodes 62 are disposed along the four side edges of a surface of first substrate 50.

Operational Advantages

The following describes the operational advantages achieved by input device 10b according to the present embodiment.

As described above, in input device 10b according to the present embodiment, input member 20 is bendable by the pressing force applied to input member 20 by the operation performed by the operation body, and second electrode 62 is disposed more spaced apart from conductive member 40 than ground electrode 63 is spaced apart from conductive member 40.

In this configuration, second electrode 62 is disposed spaced apart from the position where conductive member 40 is sandwiched between first electrode 61 and ground electrode 63. It is thus possible to dispose second electrode 62 in a position in input member 20 which is easy to bend. This enables the controller to more accurately detect the pressing force applied to input member 20 by an operation performed by the operation body.

Also, second electrode 62 is disposed spaced apart from conductive member 40 more than ground electrode 63 is spaced apart from conductive member 40. Stated differently, ground electrode 63 is disposed in the vicinity of conductive member 40 where input member 20 is hard to bend, whereas second electrode 62 is disposed in a position where input member 20 is easy to bend. This enables the controller to more accurately detect the pressing force applied to input member 20 by an operation performed by the operation body.

The present embodiment thus achieves similar effects as those achieved by the foregoing Embodiment 1, etc.

Embodiment 3

The present embodiment is different from Embodiment 1, etc. in the point, for example, that input device 10c according to the present embodiment includes no touch pad and detects the location of an operation performed by the operation body, using a plurality of second electrodes 62 instead of a touch pad. The other configuration of the present embodiment is the same as that of Embodiment 1, etc. unless otherwise specified, and thus the same elements as those of Embodiment 1 are assigned the same reference marks and will not be described in detail.

Figure 8A:
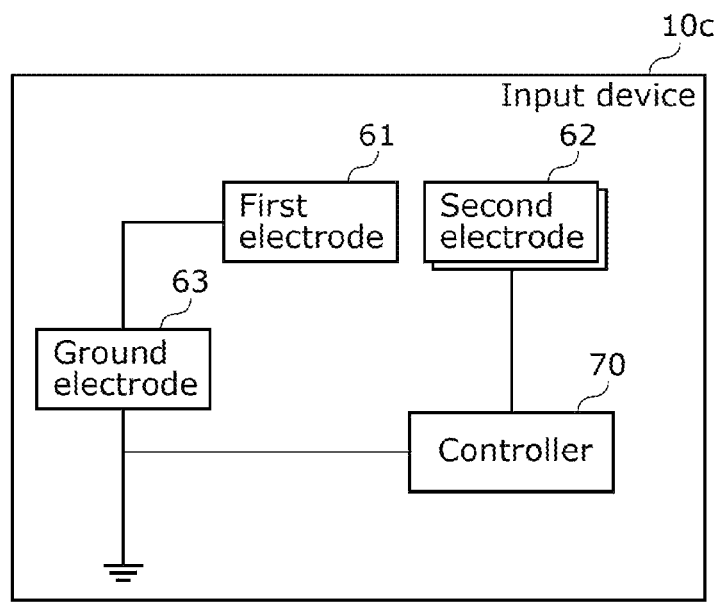
FIG. 8A is a block diagram showing an exemplary input device according to Embodiment 3.
Figure 8B:
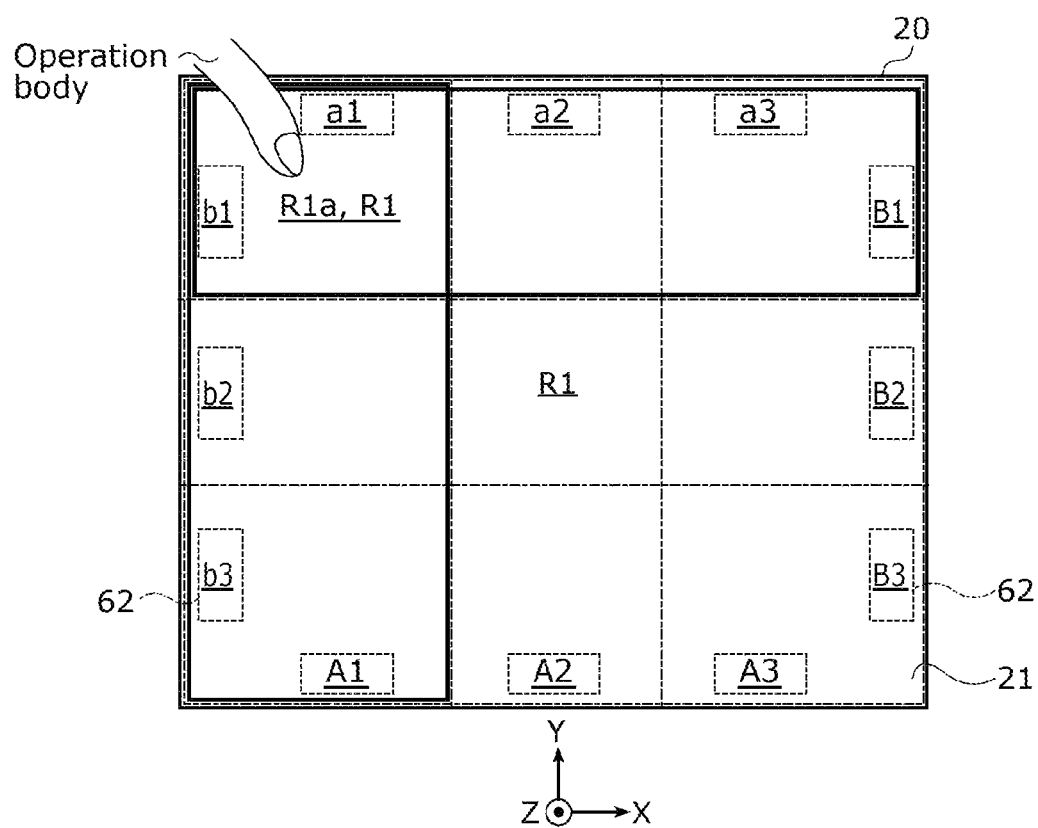
FIG. 8B is a schematic diagram showing an example of first regions and second electrodes in the input device according to Embodiment 3.

FIG. 8A is a block diagram showing an example of input device 10c according to Embodiment 3. FIG. 8B is a schematic diagram showing an example of first regions R1 and second electrodes 62 of input device 10c according to Embodiment 3.

Configuration

Figure 8C:
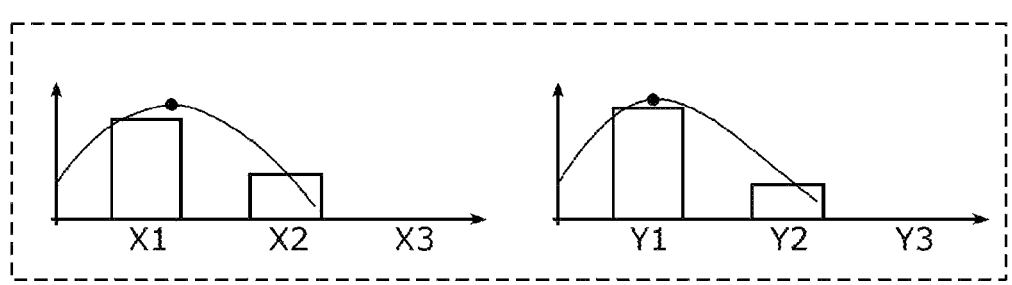
FIG. 8C is a diagram explaining an exemplary barycenter calculation in Embodiment 3.

In the present embodiment, as shown in FIG. 8A through FIG. 8C, a plurality of second electrodes 62 are disposed on a surface of first substrate 50. Note that ground electrodes 63 are also disposed on the surface of first substrate 50, but are not illustrated in FIG. 8B.

A plurality of second electrodes 62 are arranged along the side edges of first substrate 50.

First surface 21 of input member 20 includes a plurality of first regions R1 into which first surface 21 is partitioned (divided) for the detection of the location where an operation is performed by the operation body. More specifically, first surface 21 of input member 20 includes first regions R1 used to detect the location where an operation is performed by the operation body. Each first region R1 includes a second region. The second region is a region where at least first surface 21 and first electrode 61 overlap in a plan view of input member 20 from the direction in which input member 20 and first electrode 61 overlap. Each second region has high sensitivity to a pressing force applied to first surface 21. As such, the second region may serve as a different region from first region R1 to be individually used for the detection of the location where an operation is performed by the operation body. The location where the operation is performed is the location in input member 20 which is pressed downward by an operation performed by the operation body. First regions R1 are an example of detection regions.

In the present embodiment, first surface 21 is partitioned into nine first regions R1. Note that first surface 21 is not limited to being partitioned into nine first regions R1. First surface 21 may thus be partitioned into less than or equal to eight first regions R1, or greater than or equal to ten first regions R1. The number of partitioning first surface 21 into first regions R1 is changeable depending on the number of second electrodes 62.

A plurality of second electrodes 62 are disposed on first substrate 50 in one-to-one correspondence with a plurality of first regions R1. More specifically, at least one second electrode 62 (or may be at least two second electrodes 62) is disposed for each first region R1 on a surface of first substrate 50 in a manner that enables second electrode 62 to detect a change in the electrostatic capacitance.

When the user presses downward on first surface 21 of input member 20 with the operation body, controller 70 obtains a signal indicating the electrostatic capacitance from at least one second electrode 62 that has detected a change in the electrostatic capacitance between first electrode 61 and second electrode 62 among a plurality of second electrodes 62. Controller 70 extracts (detects) one of a plurality of first regions R1 that corresponds to the location where the operation is performed by the operation body, on the basis of the electrostatic capacitance between first electrode 61 and second electrode 62 indicated by the obtained signal.

Operation

Figure 9:
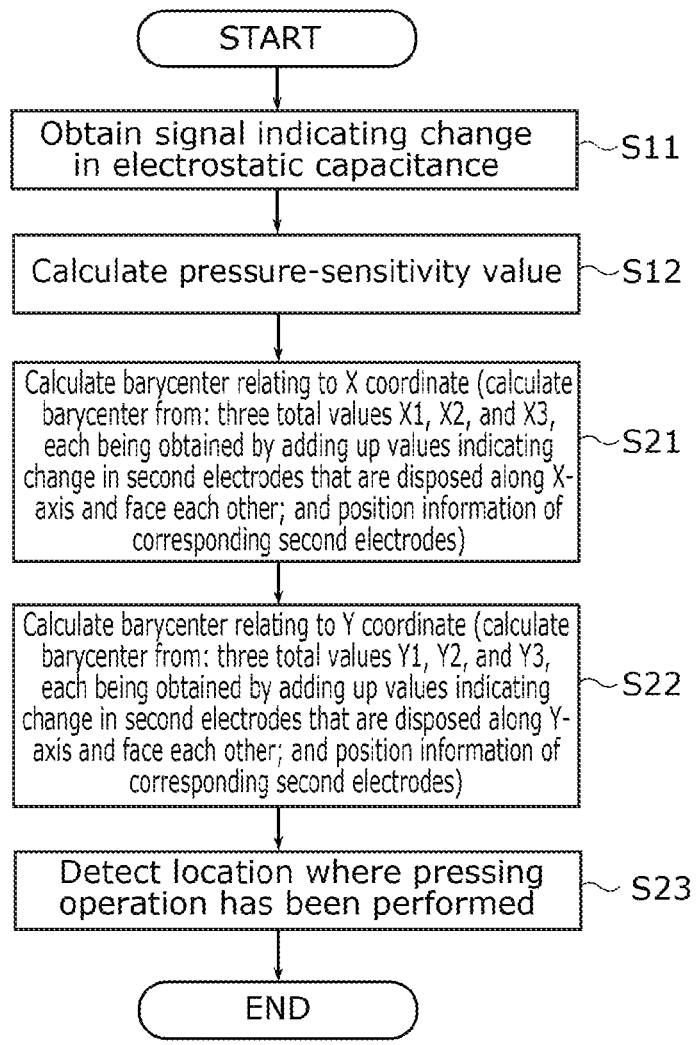
FIG. 9 is a flowchart of an operation performed by the input device according to Embodiment 3.

With reference to FIG. 8B, FIG. 8C, and FIG. 9, an operation will be described of extracting, from a plurality of first regions R1a . . . , first region R1a that corresponds to the location to which a pressing force is applied the operation body. First regions R1a . . . are included in the respective first regions R1. Note that the position of each first region R1a is merely an example, and thus is not limited to the position shown in FIG. 8B.

FIG. 8C is a diagram explaining an exemplary barycenter calculation according to Embodiment 3. FIG. 9 is a flowchart of an operation performed by input device 10c according to Embodiment 3.

As shown in FIG. 8B and FIG. 9, when the X-axis direction and the Y-axis direction that is perpendicular to the X-axis direction are defined on a surface of first substrate 50, ones of a plurality of second electrodes 62 are disposed in a plurality of lines which run along the X-axis direction and between which the central portion of the surface of first substrate 50 is located and the remaining ones of a plurality of second electrodes 62 are disposed in a plurality of lines which run along the Y-axis direction and between which the central portion of the surface of first substrate 50 is located.

More specifically, second electrodes 62 are disposed along the four side edges of the surface of first substrate 50 in the following manner: second electrodes a1, a2, and a3 (examples of second electrodes 62) are disposed in stated order along the positive direction of the X-axis from one of the corners that is located at the side of the negative direction of the X-axis and the positive direction of the Y-axis; second electrodes b1, b2, and b3 (examples of second electrodes 62) are disposed in stated order along the negative direction of the Y-axis from the foregoing corner; second electrodes A3, A2, and A1 (examples of second electrodes 62) are disposed in stated order along the negative direction of the X-axis from one of the corners that is located at the side of the positive direction of the X-axis and the negative direction of the Y-axis; and second electrodes B3, B2, and B1 (examples of second electrodes 62) are disposed in stated order along the positive direction of the Y-axis from the foregoing corner. Second electrodes 62 include second electrodes a1, a2, a3, b1, b2, b3, A1, A2, A3, B1, B2, and B3.

When the user presses downward on first surface 21 that includes first regions R1a . . . shown in FIG. 8B with the operation body, second electrodes a1, b1, a2, and b2 that are located close to the pressed location react in particular. Stated differently, since the electrostatic capacitance between first electrode 61 and each of second electrodes a1, b1, a2, and b2 changes, each of second electrodes a1, b1, a2, and b2 outputs, to controller 70, a signal indicating the change in the electrostatic capacitance. Controller 70 also obtains a signal indicating the electrostatic capacitance not only from each of second electrodes a1, b1, a2, and b2, but also from all second electrodes 62 (S11).

Subsequently, controller 70 calculates a pressure-sensitivity value on the basis of the electrostatic capacitance values indicated by the signals detected by the respective second electrode 62 (S12).

Subsequently, controller 70 calculates the barycenter, using the electrostatic capacitance values obtained from all second electrodes 62. The following expressions (1) through (4) are used, for example, for the barycenter calculation:

[Math. 1]
$$X = \frac{d_1 X1 + d_2 X2 + \ldots + d_N XN}{X1 + X2 + \ldots + XN} \times \frac{RES_x}{100} \quad \text{Expression (1)}$$

[Math. 2]
$$Y = \frac{d_1 Y1 + d_2 Y2 + \ldots + d_N YN}{Y1 + Y2 + \ldots + YN} \times \frac{RES_y}{100} \quad \text{Expression (2)}$$

[Math. 3]
$$Xk = Xak + XAk \quad \text{Expression (3)}$$

[Math. 4]
$$Yk = Ybk + YBk \quad \text{Expression (4)}$$

$RES_x$, and $RES_y$, are freely set resolutions in the X-axis direction and the Y-axis direction, respectively.

$d_k$ indicates the ratio [%] of the sensor position in the K-th line when the leftmost side is defined as 0% and the rightmost side as 100%.

Xk is a total value of all electrostatic capacitance values (e.g., Xak and XAk in the foregoing expressions) of the sensors in the K-th line group (e.g., ak, Ak in the foregoing expressions).

Yk is a total value of all electrostatic capacitance values (e.g., Ybk and YBk in the foregoing expressions) of the sensors in the K-th line group (e.g., bk, Bk in the foregoing expressions).

N is the number of lines of second electrodes 62.

X and Y are position coordinates in resolutions $RES_x$ and $RES_y$, respectively.

More specifically, using the expressions for the barycenter calculation, controller 70 calculates the location where the operation is performed from the total values obtained by adding up the electrostatic capacitance values of the corresponding second electrodes 62 disposed along the X-axis direction.

Here, a plurality of groups of at least two second electrodes 62 that face each other across the central portion are formed. Controller 70 adds up each electrostatic capacitance value between second electrode 62 and first electrode 61 on a group-by-group basis. For example, controller 70 adds up each electrostatic capacitance value between first electrode 61 and each of at least two second electrodes 62 that face each other across the central portion.

More specifically, controller 70 calculates the total values of the electrostatic capacitance values of the respective groups of the second electrodes shown in FIG. 8B: first total value X1 obtained by adding up the electrostatic capacitance values of the group of second electrodes a1 and A1; second total value X2 obtained by adding up the electrostatic capacitance values of the group of second electrodes a2 and A2; and third total value X3 obtained by adding up the electrostatic capacitance values of the group of second electrodes a3 and A3.

Controller 70 calculates the barycenter from the three total values X1, X2, and X3 corresponding to the X-axis direction and the position information of the corresponding second electrodes 62, and determines the barycenter point (S21). Barycenter point X is the position coordinate calculated as the X-coordinate in resolution RES in the X-axis direction.

Subsequently, controller 70 calculates the barycenter, using the electrostatic capacitance values obtained from all second electrodes 62. The foregoing expressions (1) through (4) are used for the barycenter calculation.

More specifically, using the expressions for the barycenter calculation, controller 70 calculates the total values of the electrostatic capacitance values of the corresponding second electrodes disposed along the Y-axis directions. For example, controller 70 calculates: first total value Y1 obtained by adding up the electrostatic capacitance values of the group of second electrodes b1 and B1; second total value Y2 obtained by adding up the electrostatic capacitance values of the group of second electrodes b2 and B2; and third total value Y3 obtained by adding up the electrostatic capacitance values of the group of second electrodes b3 and B3.

Controller 70 calculates the barycenter from the three total values Y1, Y2, and Y3 corresponding to the Y-axis direction and the position information of the corresponding second electrodes 62, and determines the barycenter point (S22). Barycenter point Y is the position coordinate calculated as the Y-coordinate in resolution $RES_y$ in the Y-axis direction.

Through the foregoing operation, controller 70 determines that X and Y are the position coordinates (X, Y) which is pressed downward. Stated differently, controller 70 calculates the barycenter on the basis of the total values, thereby detecting the location where the pressing operation is performed by the operation body (S23).

Note that the disposition of second electrodes 62 shown in FIG. 8B is merely an example and thus is not limited to the disposition described in the present embodiment. In FIG. 8B, for example, a plurality of second electrodes 62 may be simply disposed along the X-axis direction or the Y-axis direction. Also, second electrodes 62 may be grouped by freely selecting ones of a plurality of second electrodes 62.

Operational Advantages

The following describes the operational advantages achieved by input device 10c according to the present embodiment.

In input device 10c according to the present embodiment, as described above, first surface 21 includes a plurality of first regions R1 into which first surface 21 is partitioned for the detection of the location in input member 20 which is pressed downward by an operation performed by the operation body. A plurality of second electrodes 62 are disposed on first substrate 50 in one-to-one correspondence with a plurality of first regions R1. Controller 70 detects the location where the operation is performed by the operation body, on the basis of the electrostatic capacitance between first electrode 61 and each second electrode 62.

With this, it is possible to detect the location in input member 20 which is pressed downward by an operation performed by the operation body, without a touch sensor for detecting such location of the pressing operation. This thus prevents a rise in the product cost of input device 10c.

In input device 10c according to an aspect of the present disclosure, a plurality of second electrodes 62 are grouped into a plurality of groups each including at least two of a plurality of second electrodes 62, and controller 70 calculates, for each of the plurality of groups, a total value by adding up values of the electrostatic capacitance between a plurality of second electrodes 62 and first electrode 61, and calculates a barycenter based on the total value to detect the location where the operation is performed by the operation body.

With this, it is possible to detect the location where the operation is performed. Input device 10c having a simple configuration thus enables the detection of the location in the central portion which is pressed downward, thus eliminating the necessity of using, for example, a touch pad, etc. This configuration thus prevents the configuration of input device 10c from becoming complicated.

In input device 10c according to the present embodiment, when an X-axis direction and a Y-axis direction that is perpendicular to the X-axis direction are defined on a surface of first substrate 50, ones of a plurality of second electrodes 62 are disposed in a plurality of lines which run along the X-axis direction and between which a central portion of the surface of first substrate 50 is located and remaining ones of a plurality of second electrodes 62 are disposed in a plurality of lines which run along the Y-axis direction and between which the central portion of the surface of first substrate 50 is located, a plurality of second electrodes 62 are grouped into the plurality of groups each including at least two of a plurality of second electrodes 62 that face each other across the central portion, and controller 70 calculates, for each of the plurality of groups, the total value by adding up the values of the electrostatic capacitance between a plurality of second electrodes 62 and first electrode 61, and calculates the barycenter based on the total value to detect the location where the operation is performed by the operation body.

This configuration enables a more accurate detection of the location where the operation is performed.

The present embodiment thus achieves similar effects as those achieved by the foregoing Embodiment 1, etc.

Embodiment 4

The present embodiment is different from Embodiment 1, etc. in the point, for example, that the input device according to the present embodiment corrects a pressure-sensitivity value, which is the value indicating the detected pressing force applied to input member 20. The other configuration of the present embodiment is the same as that of Embodiment 1, etc. unless otherwise specified, and thus the same elements as those of Embodiment 1 are assigned the same reference marks and will not be described in detail.

Figure 10:
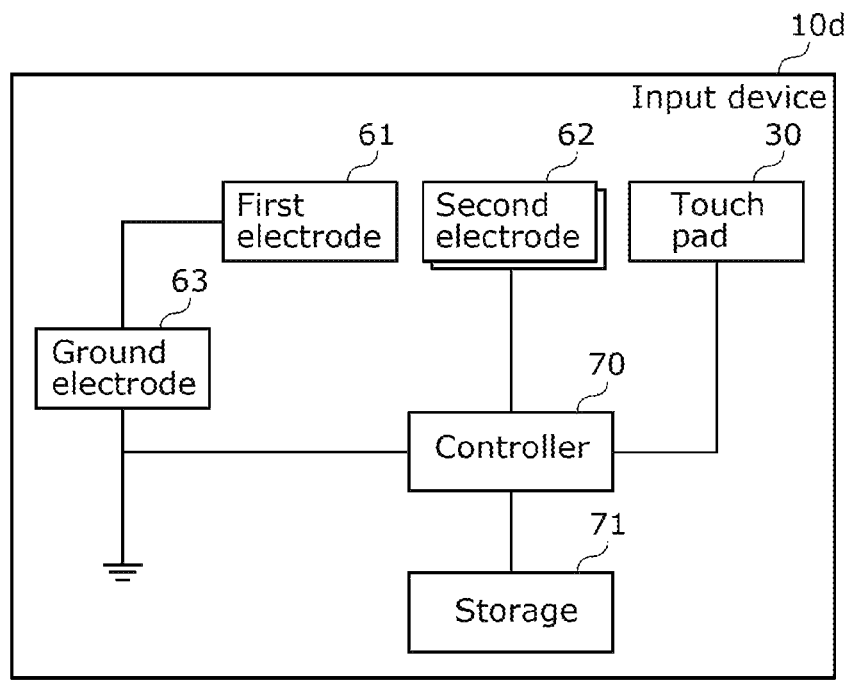
FIG. 10 is a block diagram showing an exemplary input device according to Embodiment 4.
Figure 11:
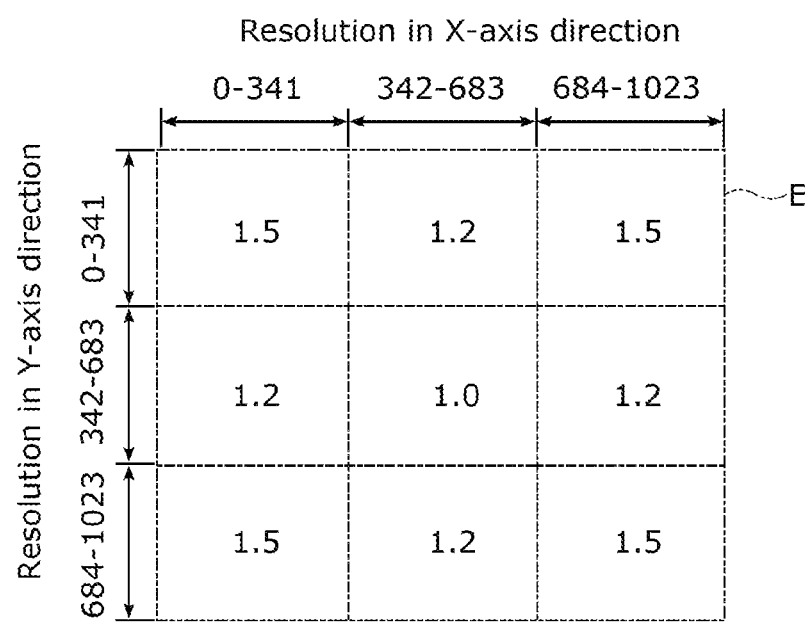
FIG. 11 is a diagram explaining an example of regions and correction values in the input device according to Embodiment 4.

FIG. 10 is a block diagram showing an example of input device 10d according to Embodiment 4. FIG. 11 is a diagram explaining an example of regions E and correction values in input device 10d according to Embodiment 4.

Configuration

As shown in FIG. 10 and FIG. 11, input device 10d further includes storage 71, in addition to input member 20, touch pad 30, first electrodes 61, conductive members 40, first substrate 50, ground electrodes 63, second electrodes 62, and controller 70.

Storage 71 is electrically connected to controller 70. Storage 71 stores a plurality of correction values each being assigned to the corresponding one of regions E into which first surface 21 is preliminarily divided according to settings.

These correction values are values that are, for example, calculated on the basis of the amount of bending of input member 20 when first surface 21 is pressed downward by the operation body with a constant load. More specifically, as shown in FIG. 7 illustrating the variation of Embodiment 1, when the side edges of input member 20 are sandwiched between frame body 91 and case 92, for example, portions on first surface 21 which are in the vicinity of the side edges of input member 20 and which contact frame body 91 are hard to bend even when being pressed downward by the operation body. When the side edges of input member 20 are supported by a certain member, portions on first surface 21 which are in the vicinity of the side edges are also hard to bend, even without being sandwiched between frame body 91 and case 92. For this reason, as shown in FIG. 10 and FIG. 11, the amounts of bending of input member 20 are preliminarily measured and causes storage 71 to store the correction values that corresponds to the measured amounts of bending.

In the present embodiment, first surface 21 is virtually divided into nine regions E. Each of the resulting nine regions E is assigned a correction value that corresponds to the amount of bending. Storage 71 stores, in association with each other, each correction value and the location that identifies region E associated with the correction value.

Controller 70 detects one of a plurality of regions E that corresponds to the detected location in input member 20 which is pressed downward by the operation body. The location pressed downward is detectable by touch electrode 31 described in Embodiment 1, etc. described above. The accuracy of the detected location in input member 20 which is pressed downward depends on the resolution of touch pad 30.

Note that without using touch electrode 31, the foregoing configuration of Embodiment 3 may be used to detect the location where the pressing force is detected. For this reason, the present embodiment may be combined with Embodiment 3.

Controller 70 obtains the correction value assigned to the detected region E. More specifically, controller 70 retrieves from storage 71 the correction value assigned to region E that corresponds to the location to which the pressing force is applied in input member 20. Controller 70 corrects the pressure-sensitivity value in accordance with the pressing force applied to input member 20, on the basis of the obtained correction value having been retrieved.

Operation

Figure 12:
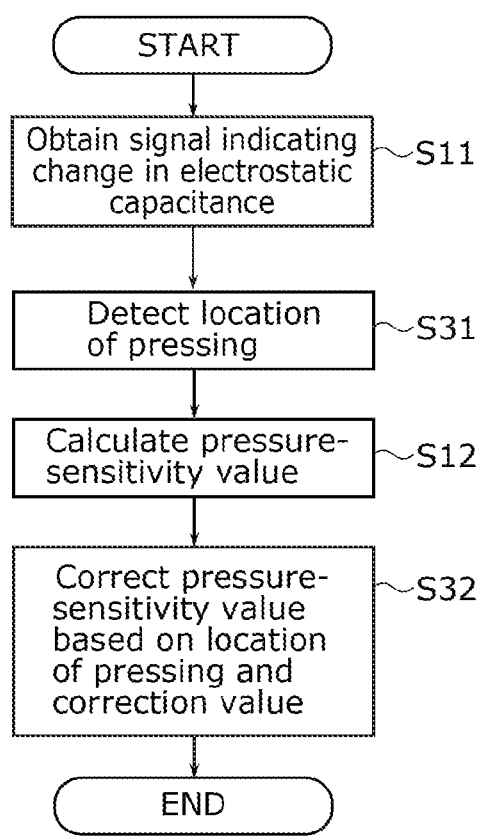
FIG. 12 is a flowchart of an operation performed by the input device according to Embodiment 4.

With reference to FIG. 12, the correction of a pressure-sensitivity value on the basis of a correction value will be described.

FIG. 12 is a flowchart of an operation performed by input device 10d according to Embodiment 4.

In the present embodiment, as shown in FIG. 11 and FIG. 12, touch electrode 31 has the resolution of 1024×1024 in the X-axis direction and the Y-axis direction, respectively. Touch electrode 31 is virtually divided into nine regions E on the basis of the amounts of bending of input member 20 by being virtually divided into three regions in the X-axis direction and being virtually divided into three regions in the Y-axis direction.

In the nine regions E, side edges of input member 20, which are hard to bend, are assigned the correction value of 1.2, the corner portions, which are harder to bend, are assigned the correction value of 1.5, and the central portion, which is easiest to bend, is assigned the correction value of 1.0. The correction values depend on the material of input member 20. As such, the foregoing values are merely an example, and thus the correction values are not limited to those of the present embodiment.

When touch electrode 31 detects the location in input member 20 which is pressed downward by the operation body (S31) after controller 70 obtains the signals indicating the electrostatic capacitances (S11), controller 70 identifies one of a plurality of regions E that corresponds to the location detected by touch electrode 31, and retrieves from storage 71 the correction value that is associated with the identified region E. Controller 70 calculates a pressure-sensitivity value on the basis of the electrostatic capacitance values detected by the respective second electrodes 62 (S12).

Controller 70 applies the correction value retrieved from storage 71 to the pressure-sensitivity value, thereby correcting the pressure-sensitivity value (S32). More specifically, controller 70 multiplies the pressure-sensitivity value by the correction value. Controller 70 is capable of obtaining the corrected pressure-sensitivity value in the foregoing manner.

Operational Advantages

The following describes the operational advantages achieved by input device 10d according to the present embodiment.

As described above, input device 10d according to the present embodiment includes: storage 71 that stores a plurality of correction values assigned to a plurality of regions E into which first surface 21 is preliminarily partitioned according to settings. Here, controller 70: detects, from a plurality of regions E, region E that corresponds to a location where the pressing force is detected, the pressing force being applied to input member 20 by the operation performed by the operation body; obtains a corresponding one of the correction values that is assigned to region E detected; and corrects the pressure-sensitivity value that is the value indicating the pressing force detected, based on the corresponding one of the correction values obtained, the pressing force being applied to input member 20.

With this, it is possible to correct the pressure-sensitivity value on the basis of the amount of bending that depends on a location in input member 20, regardless of the location in input member 20 which is pressed downward by an operation performed by the operation body. This enables an accurate detection of the pressing force applied to input member 20.

In input device 10d according to the present embodiment, each of the correction values is a value that is calculated based on an amount of bending of input member 20 when first surface 21 is pressed downward by the operation body with a constant load.

With this, it is possible to calculate a correction value in consideration of the properties of input member 20, a member relating to an orientation of input member 20, etc. This enables a more accurate detection of the pressing force applied to input member 20.

The present embodiment thus achieves similar effects as those achieved by the foregoing Embodiment 1, etc.

Other Variations, Etc.

The present disclosure has been described on the basis of Embodiments 1 through 4, but the present disclosure is not limited to these embodiments, etc.

Figure 13:
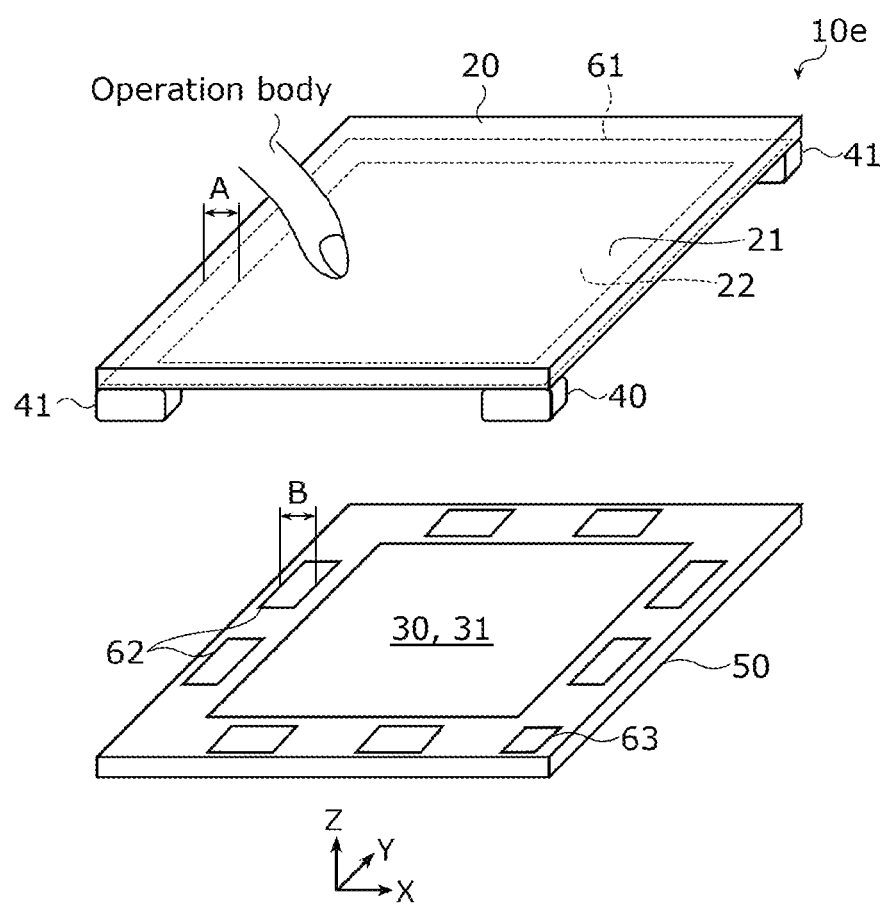
FIG. 13 is an exploded perspective view showing an exemplary input device according to another variation.

In an example shown in FIG. 2, for example, the input device according to each of the foregoing Embodiments 1 through 4 includes conductive members 40 that are provided at the respective four corners of second surface 22 of input member 20, but the present disclosure is not limited to this configuration. For example, conductive members 40 may be configured as shown in FIG. 13. FIG. 13 is an exploded perspective view showing an example of input device 10e according to another variation. As shown in FIG. 13, input device 10e may be configured to include conductive member 40 disposed in at least one of the four corners of second surface 22.

Stated differently, at least one conductive member 40 may be disposed between first electrodes 61 and ground electrode 63. Note that in an example shown in FIG. 13, first electrodes 61 are serially connected so that first electrodes 61 are electrically connected to all ground electrodes 63 via conductive member 40. Stated differently, first electrodes 61 may be a single electrode that is disposed in a ring form along the side edges of second surface 22.

Note that in an example shown in FIG. 13, supporting bodies 41 are disposed at corners of second surface 22 other than the corner at which conducive member 40 is disposed, among the four corners of second surface 22. Supporting bodies 41 may comprise, for example, a member having no conductivity. In this case, whether to use conductive member 40 or supporting body 41 is selectable, thus providing a wider selection of members to be disposed at the four corners of second surface 22.

As shown in FIG. 13, the input device according to each of the foregoing Embodiments 1 through 4 may have a configuration in which ground electrode 63 is disposed in a position corresponding to one conductive member 40 and not disposed in a position corresponding to supporting body 41.

Also, as shown in FIG. 13, the input device according to each of the foregoing Embodiments 1 through 4 may be configured so that width B of second electrode 62 (the length of second electrode 62 in a short side direction) is less than width A of first electrode 61 (the length of first electrode 61 in a short side direction).

As shown in FIG. 2 and FIG. 13, touch electrode 31 may be disposed closer to the central portion of input member 20 than first electrode 61 when viewed in the direction (the Z-axis direction) that faces second surface 22 of input member 20. Also, first electrode 31 is disposed not to overlap touch electrode 31 when touch electrode 31 is viewed in the direction (the Z-axis direction) that faces second surface 22 of input member 20.

Also, the controller and other elements included in the input device according to each of the foregoing Embodiments 1 through 4 are implemented as an LSI that is typically an integrated circuit.

These may take the form of individual chips, or one or more or all of them may be encapsulated into a single chip.

The controller and other elements included in the input device according to each of the foregoing Embodiments 1 through 4 are not limited to being integrated into an LSI. They may be implemented as a dedicated circuit or a general-purpose processor. A field programmable gate array (FPGA) that allows for programming after the manufacture of an LSI, or a reconfigurable processor that allows for reconfiguration of the connection and the settings of circuit cells inside an LSI may be employed.

The elements in each of the foregoing Embodiments 1 through 4 may be configured in the form of an exclusive hardware product, or may be realized by executing a software program suitable for each of the elements. Each of the elements may be realized by means of a program executing unit, such as a CPU and a processor, reading and executing the software program recorded on a recording medium such as a hard disk or a semiconductor memory.

Also, all numerics used in the above description are examples to specifically describe the present disclosure, and thus numerics are not limited to those used as examples in Embodiments 1 through 4 according to the present disclosure.

Also, the division of the functional blocks in the block diagrams is an example, and thus a plurality of functional blocks may be implemented as a single functional block, a single functional block may be divided into a plurality of blocks, and one or more functions may be moved to another functional block. Also, the functions of a plurality of functional blocks having similar functions may be processed by single hardware or software in parallel or in a time-shared manner.

Also, the order of executing the steps in each of the flowcharts is an example to specifically describe the present disclosure, and thus may be other orders. One or more of the steps may be executed simultaneously (in parallel) with another step.

The scope of the present disclosure also includes: an embodiment achieved by making various modifications and alterations to Embodiments 1 through 4 that can be conceived by those skilled in the art; and an embodiment achieved by freely combining structural components and functions of Embodiments 1 through 4 without departing from the essence of the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings and claims are incorporated herein by reference in their entirety: Japanese Patent Application No. 2020-216018 filed on Dec. 25, 2020 and Japanese Patent Application No. 2021-104090 filed on Jun. 23, 2021.

INDUSTRIAL APPLICABILITY

The present disclosure is applicable for use as, for example, an input device mounted on a vehicle.

The invention claimed is:

1. An input device comprising:
an input member that includes a first surface on which an operation is performed by an operation body and a second surface that is a back surface of the first surface;
a first electrode that is electrically connected to a ground and is disposed on the second surface;
a second electrode that faces the first electrode and is disposed spaced apart from the first electrode;
a ground electrode that is electrically connected to the ground and disposed in a position that corresponds to a position of the first electrode;
a conductive member that is sandwiched between the first electrode and the ground electrode; and
a controller that detects a pressing force applied to the input member by an operation performed by the operation body, based on an electrostatic capacitance between the first electrode and the second electrode, and calculates a pressure-sensitivity value that is a value indicating the pressing force detected.

2. The input device according to claim 1, comprising:
a first substrate on which the second electrode and the ground electrode are provided.

3. The input device according to claim 1, comprising:
a first substrate on which the second electrode is provided; and
a second substrate on which the ground electrode is provided,
wherein the first substrate is disposed between the second substrate and the input member.

4. The input device according to claim 1,
wherein the conductive member is disposed in each of four corners of the input member.

5. The input device according to claim 1,
wherein the first electrode is disposed along a side edge of the second surface.

6. The input device according to claim 5, comprising:
a third electrode that is disposed to face the second surface of the input member,
wherein the third electrode is disposed in a position closer to a central portion of the input member than a position of the first electrode is, when viewed in a direction in which the third electrode faces the second surface of the input member.

7. The input device according to claim 6,
wherein the third electrode is a touch electrode for detecting a location in the input member touched by the operation body.

8. The input device according to claim 7,
wherein a width of the second electrode is less than a width of the first electrode.

9. The input device according to claim 8,
wherein the first electrode does not overlap the third electrode, when viewed in the direction in which the third electrode faces the second surface of the input member.

10. The input device according to claim 1,
wherein a plurality of first electrodes are serially connected along side edges of the second surface, the plurality of first electrodes each being the first electrode, and
at least one conductive member is provided between the plurality of first electrodes and the ground electrode, the at least one conductive member each being the conductive member.

11. The input device according to claim 1,
wherein the input member is bendable by the pressing force applied to the input member by the operation performed by the operation body, and
the second electrode is disposed more spaced apart from the conductive member than the ground electrode is spaced apart from the conductive member.

12. The input device according to claim 2,
wherein the first surface is partitioned to include a plurality of detection regions to detect a location where the pressing force is applied to the input member by the operation performed by the operation body,
a plurality of second electrodes are disposed on the first substrate in one-to-one correspondence with the plurality of detection regions, the plurality of second electrodes each being the second electrode, and
the controller detects the location where the operation is performed by the operation body, based on the electrostatic capacitance between the first electrode and each of the plurality of second electrodes.

13. The input device according to claim 12,
wherein the plurality of second electrodes are grouped into a plurality of groups each including at least two of the plurality of second electrodes, and
the controller calculates, for each of the plurality of groups, a total value by adding up values of the electrostatic capacitance between the plurality of second electrodes and the first electrode, and calculates a barycenter based on the total value to detect the location where the operation is performed by the operation body.

14. The input device according to claim 13,
wherein when an X-axis direction and a Y-axis direction that is perpendicular to the X-axis direction are defined on a surface of the first substrate, ones of the plurality of second electrodes are disposed in a plurality of lines which run along the X-axis direction and between which a central portion of the surface of the first substrate is located and remaining ones of the plurality of second electrodes are disposed in a plurality of lines which run along the Y-axis direction and between which the central portion of the surface of the first substrate is located,
the plurality of second electrodes are grouped into the plurality of groups each including at least two of the plurality of second electrodes that face each other across the central portion, and
the controller calculates, for each of the plurality of groups, the total value by adding up the values of the electrostatic capacitance between the plurality of second electrodes and the first electrode, and calculates the barycenter based on the total value to detect the location where the operation is performed by the operation body.

15. The input device according to claim 1, comprising:
a storage that stores a plurality of correction values assigned to a plurality of regions into which the first surface is preliminarily partitioned according to settings,
wherein the controller:
detects, from the plurality of regions, a region that corresponds to a location where the pressing force is detected, the pressing force being applied to the input member by the operation performed by the operation body;
obtains a corresponding one of the correction values that is assigned to the region detected; and
corrects the pressure-sensitivity value that is the value indicating the pressing force detected, based on the corresponding one of the correction values obtained, the pressing force being applied to the input member.

16. The input device according to claim 15,
wherein each of the correction values is a value that is calculated based on an amount of bending of the input member when the first surface is pressed downward by the operation body with a constant load.

17. An input device comprising:
an input member that includes a first surface on which an operation is performed by an operation body and a second surface that is a back surface of the first surface;
a first electrode that is disposed on the second surface;
a second electrode that faces the first electrode and is disposed spaced apart from the first electrode;
a controller that detects a pressing force applied to the input member by an operation performed by the operation body, based on an electrostatic capacitance between the first electrode and the second electrode, and calculates a pressure-sensitivity value that is a value indicating the pressing force detected; and a storage that stores a plurality of correction values assigned to a plurality of regions into which the first surface is preliminarily partitioned according to settings, wherein the first electrode is electrically connected to a ground, wherein the controller:
- detects, from the plurality of regions, a region that corresponds to a location where the pressing force is detected, the pressing force being applied to the input member by the operation performed by the operation body;
- obtains a corresponding one of the correction values that is assigned to the region detected; and
- corrects the pressure-sensitivity value that is the value indicating the pressing force detected, based on the corresponding one of the correction values obtained.

18. The input device according to claim 17, wherein each of the correction values is a value that is calculated based on an amount of bending of the input member when the first surface is pressed downward by the operation body with a constant load.

* * * * *